(12) United States Patent
Iwanaga et al.

(10) Patent No.: US 7,913,575 B2
(45) Date of Patent: Mar. 29, 2011

(54) ULTRASONIC FLOW RATE MEASURING DEVICE

(75) Inventors: Shigeru Iwanaga, Osaka (JP); Yuji Nakabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 129 days.

(21) Appl. No.: 12/439,646

(22) PCT Filed: Sep. 20, 2007

(86) PCT No.: PCT/JP2007/068302
§ 371 (c)(1),
(2), (4) Date: Mar. 2, 2009

(87) PCT Pub. No.: WO2008/035744
PCT Pub. Date: Mar. 27, 2008

(65) Prior Publication Data
US 2010/0005902 A1      Jan. 14, 2010

(30) Foreign Application Priority Data

Sep. 20, 2006   (JP) .................................. 2006-254432

(51) Int. Cl.
*G01F 1/84* (2006.01)
(52) U.S. Cl. ..................................................... 73/861.27
(58) Field of Classification Search ........................ None
See application file for complete search history.

(56) References Cited

U.S. PATENT DOCUMENTS

| 6,026,693 A | 2/2000 | Baumoel et al. |
| 6,216,544 B1 * | 4/2001 | Adachi et al. ............. 73/861.25 |
| 2010/0064821 A1 * | 3/2010 | Nakabayashi et al. ..... 73/861.27 |

FOREIGN PATENT DOCUMENTS

| JP | 62-009223 A | 1/1987 |
| JP | 2002-5705 A | 1/2002 |
| JP | 2004-45425 A | 2/2004 |
| JP | 2004-251700 A | 9/2004 |
| JP | 2005-257363 A | 9/2005 |
| WO | WO 2004/074783 A1 | 9/2004 |

OTHER PUBLICATIONS

International Search Report issued Oct. 16, 2007 in International application No. PCT/JP2007/068302, 2pages.
European Search Report for European Application No. 07807654.4, dated Sep. 25, 2009, 6 pages.

* cited by examiner

*Primary Examiner* — Harshad Patel
(74) *Attorney, Agent, or Firm* — Brinks Hofer Gilson & Lione

(57) ABSTRACT

An ultrasonic flow rate measuring device according to the present invention improves a measuring accuracy. An ultrasonic flow rate measuring device includes an ultrasonic measuring portion in which a first ultrasonic transmitter-receiver and a second ultrasonic transmitter-receiver are provided to a measurement passage, and first to fifth partitioning plates are set substantially in parallel with an ultrasonic wave propagation path that connects the first ultrasonic transmitter-receiver and the second ultrasonic transmitter-receiver, whereby first to sixth flat passages are laminated/formed in the measurement passage by the partitioning plates. In this ultrasonic flow rate measuring device, the first ultrasonic transmitter-receiver and the second ultrasonic transmitter-receiver are arranged such that the ultrasonic measuring portion 20 measures the flow rate of the flat passage that is offset from the center along the lamination direction of the flat passages.

13 Claims, 7 Drawing Sheets

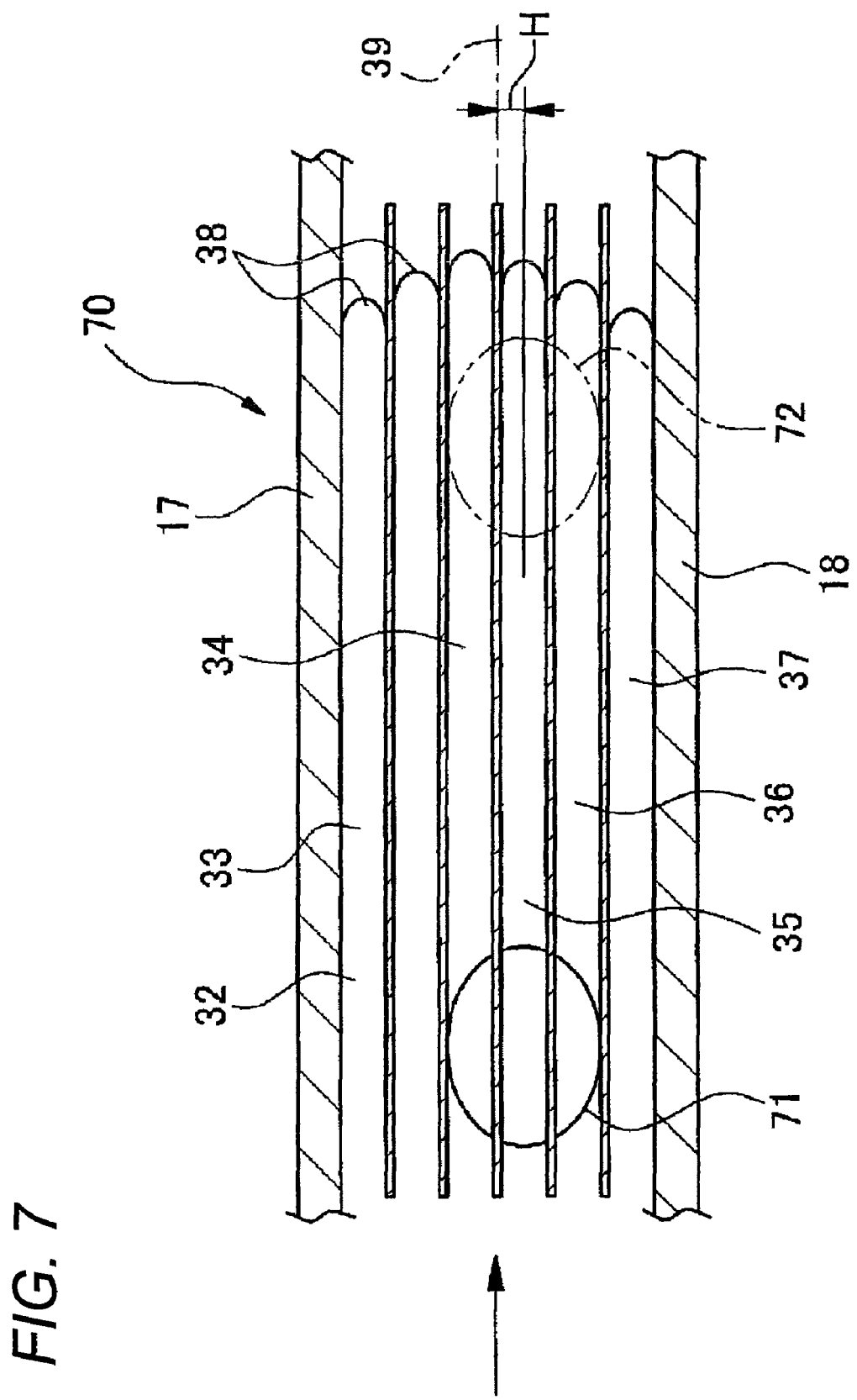

ULTRASONIC FLOW RATE MEASURING DEVICE

TECHNICAL FIELD

The present invention relates to an ultrasonic flow rate measuring device which is constructed such that a first ultrasonic transmitter-receiver and a second ultrasonic transmitter-receiver of an ultrasonic measuring portion are provided to a measurement passage so as to measure a flow rate of a fluid flowing through the measurement passage by the ultrasonic measuring portion.

BACKGROUND ART

The ultrasonic flow rate measuring device is a device that measures a propagation time of an ultrasonic wave which is caused to propagate across a measurement passage while flowing a fluid through the measurement passage, and detects a flow rate of the fluid based on the measured information.

A pair of ultrasonic transmitter-receivers are provided respectively to the opposing short sides of the measurement passage, whose cross-section is rectangular.

These paired ultrasonic transmitter-receivers face each other and transmit/receive a ultrasonic wave between them along a line, which intersects with the flow direction of the measurement passage at a predetermined angle.

Also, an ultrasonic flow rate measuring device has been proposed in which the measurement passage is constructed of multi-layered passages formed by partitioning the measurement passage with a plurality of parallelly arranged partitioning plates in order to improve the measuring accuracy (see Patent Literature 1, for example).
Patent Literature 1: WO2004/074783

DISCLOSURE OF THE INVENTION

Problems that the Invention is to Solve

However, when the measurement passage is constructed of the multi-layered passages, for example, the flow rate has the maximum value in the center layer passage of the multiple layered passages, whereas the flow rate progressively decreases as shifting away from the center layer passage.

Since the fluid flows through the multi-layered passages at different flow rates in the layered passages, there existed a need to improve the accuracy of measuring the average flow rate of the fluid that flows through the measurement passages.

The present invention aims at providing an ultrasonic flow rate measuring device capable of improving the accuracy of measuring the average flow rate.

Means for Solving the Problems

An ultrasonic flow rate measuring device of the present invention, includes a measurement passage through which a fluid flows; an ultrasonic measuring portion comprising a first ultrasonic transmitter-receiver and a second ultrasonic transmitter-receiver provided to the measurement passage; and a plurality of partitioning plates arranged in the measurement passage such that the partitioning plates are set substantially in parallel with an ultrasonic wave propagation path that connects the first ultrasonic transmitter-receiver and the second ultrasonic transmitter-receiver and form a plurality of flat passages laminated in the measurement passage, wherein the first ultrasonic transmitter-receiver and the second ultrasonic transmitter-receiver are arranged such that the ultrasonic wave propagation path is offset from the center of the measurement passage along a direction in which the flat passages laminate.

Here, a flow rate in the flat passage located near the center along the lamination direction tends to have a highest value. Therefore, the first ultrasonic transmitter-receiver and the second ultrasonic transmitter-receiver are arranged such that the ultrasonic measuring portion measures a flow rate of a flat passage that is offset from the center along the lamination direction.

Since a flow rate of the flat passage is measured, which is not the flat passage that is located near the center, through which the fluid flows at the highest flow rate, a value close to an average flow rate can be measured.

Also, in the ultrasonic flow rate measuring device of the present invention, the first ultrasonic transmitter-receiver and the second ultrasonic transmitter-receiver are arranged to face a flat passage through which a fluid flows at a flow rate substantially equal to the average flow rate.

The first ultrasonic transmitter-receiver and the second ultrasonic transmitter-receiver are arranged to face a flat passage through which a fluid flows at a flow rate substantially equal to the average flow rate. Therefore, the average flow rate can be measured by the first ultrasonic transmitter-receiver and the second ultrasonic transmitter-receiver.

Also, in the ultrasonic flow rate measuring device of the present invention, the first ultrasonic transmitter-receiver and the second ultrasonic transmitter-receiver are arranged to extend over a plurality of flat passages that are continuously laminated.

The first ultrasonic transmitter-receiver and the second ultrasonic transmitter-receiver are arranged to extend over a plurality of continuously laminated flat passages which are exclusive of flat passages that are located near the center through which a fluid flows at the highest flow rate.

Since a flow rate of the fluid passing through a plurality of flat passages is measured, a value close to an average flow rate can be measured.

Also, in the ultrasonic flow rate measuring device of the present invention, the first ultrasonic transmitter-receiver and the second ultrasonic transmitter-receiver are arranged to face flat passages that are exclusive of flat passages, through which the fluid passes at the highest flow rate, and exclusive of one of flat passages, through which the fluid passages at the lowest flow rate.

The first ultrasonic transmitter-receiver and the second ultrasonic transmitter-receiver are arranged to face flat passages which are exclusive of flat passages, through which the fluid passes at the highest flow rate, and exclusive of one of flat passages, through which the fluid passes at the lowest flow rate. Therefore, a value close to an average flow rate can be measured by the first ultrasonic transmitter-receiver and the second ultrasonic transmitter-receiver.

Also, an ultrasonic flow rate measuring device of the present invention includes a measurement passage through which a fluid flows; an ultrasonic measuring portion comprising a first ultrasonic transmitter-receiver and a second ultrasonic transmitter-receiver provided to the measurement passage; and a plurality of partitioning plates arranged in the measurement passage such that the partitioning plates are set substantially in parallel with an ultrasonic wave propagation path that connects the first ultrasonic transmitter-receiver and the second ultrasonic transmitter-receiver and form a plurality of flat passages laminated in the measurement passage, wherein the first ultrasonic transmitter-receiver and the second ultrasonic transmitter-receiver are arranged to face flat passages which are exclusive of flat passages, through which the fluid passages at the highest flow rate, and exclusive of one of flat passages, through which the fluid passes at the lowest flow rate.

The first ultrasonic transmitter-receiver and the second ultrasonic transmitter-receiver are arranged to face flat passages which are exclusive of the flat passages, through which the fluid passes at the highest flow rate, and exclusive of one of the flat passages, through which the fluid passes at the lowest flow rate. Therefore, a value close to an average flow rate can be measured by the first ultrasonic transmitter-receiver and the second ultrasonic transmitter-receiver.

Also, in the ultrasonic flow rate measuring device of the present invention, the ultrasonic wave propagation path that connects the first ultrasonic transmitter-receiver and the second ultrasonic transmitter-receiver has an angle with respect to a fluid flow flowing through the measurement passage.

Also, in the ultrasonic flow rate measuring device of the present invention, the first ultrasonic transmitter-receiver and the second ultrasonic transmitter-receiver are both provided to one of side walls of the measurement passage, and a propagation time of an ultrasonic wave is measured by causing an ultrasonic wave to reflect on the other side wall of the measurement passage.

Also, in the ultrasonic flow rate measuring device of the present invention, the ultrasonic wave propagation path that connects the first ultrasonic transmitter-receiver and the second ultrasonic transmitter-receiver is set substantially in parallel with a fluid flow flowing in the measurement passage.

Also, the ultrasonic flow rate measuring device of the present invention further includes a second ultrasonic measuring portion, wherein the first ultrasonic transmitter-receiver and the second ultrasonic transmitter-receiver of the first ultrasonic measuring portion are arranged such that the first ultrasonic measuring portion measures a flow rate of one flat passage that is offset from the center along the lamination direction, and the first ultrasonic transmitter-receiver and the second ultrasonic transmitter-receiver of the second ultrasonic measuring portion are arranged such that the second ultrasonic measuring portion measures a flow rate of another flat passage that is also offset from the center along the lamination direction.

Also, in the ultrasonic flow rate measuring device of the present invention, the ultrasonic wave propagation path of the first ultrasonic measuring portion and the ultrasonic wave propagation path of the second ultrasonic measuring portion are set in parallel when viewed along the lamination direction.

Also, in the ultrasonic flow rate measuring device of the present invention, the ultrasonic wave propagation path of the first ultrasonic measuring portion and the ultrasonic wave propagation path of the second ultrasonic measuring portion intersect with each other when viewed along the lamination direction.

ADVANTAGES OF THE INVENTION

According to the ultrasonic flow rate measuring device of the present invention, a value close to the average flow rate can be measured by the first ultrasonic transmitter-receiver and the second ultrasonic transmitter-receiver, and therefore the measuring accuracy can be improved.

BRIEF DESCRIPTION OF THE DRAWINGS

FIG. 7 is an enlarged view showing an ultrasonic measuring portion of an ultrasonic flow rate measuring device according to a fourth embodiment.

BEST MODE FOR CARRYING OUT THE INVENTION

Respective ultrasonic flow rate measuring devices according to embodiments of the present invention will be explained with reference to the drawings hereinafter.

First Embodiment

Figure 1:
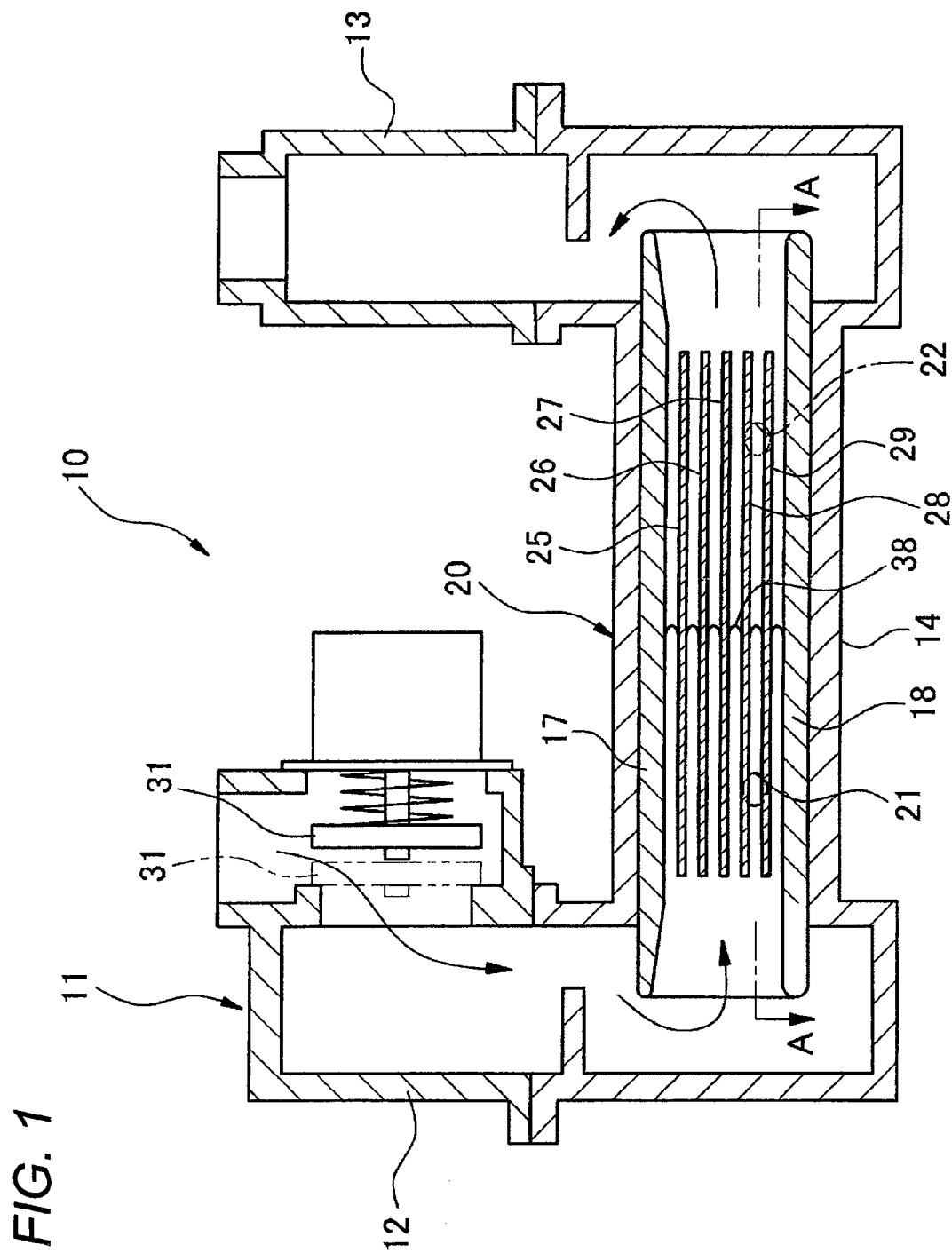
FIG. 1 is a sectional view showing an ultrasonic flow rate measuring device (first embodiment) according to the present invention.
Figure 2:
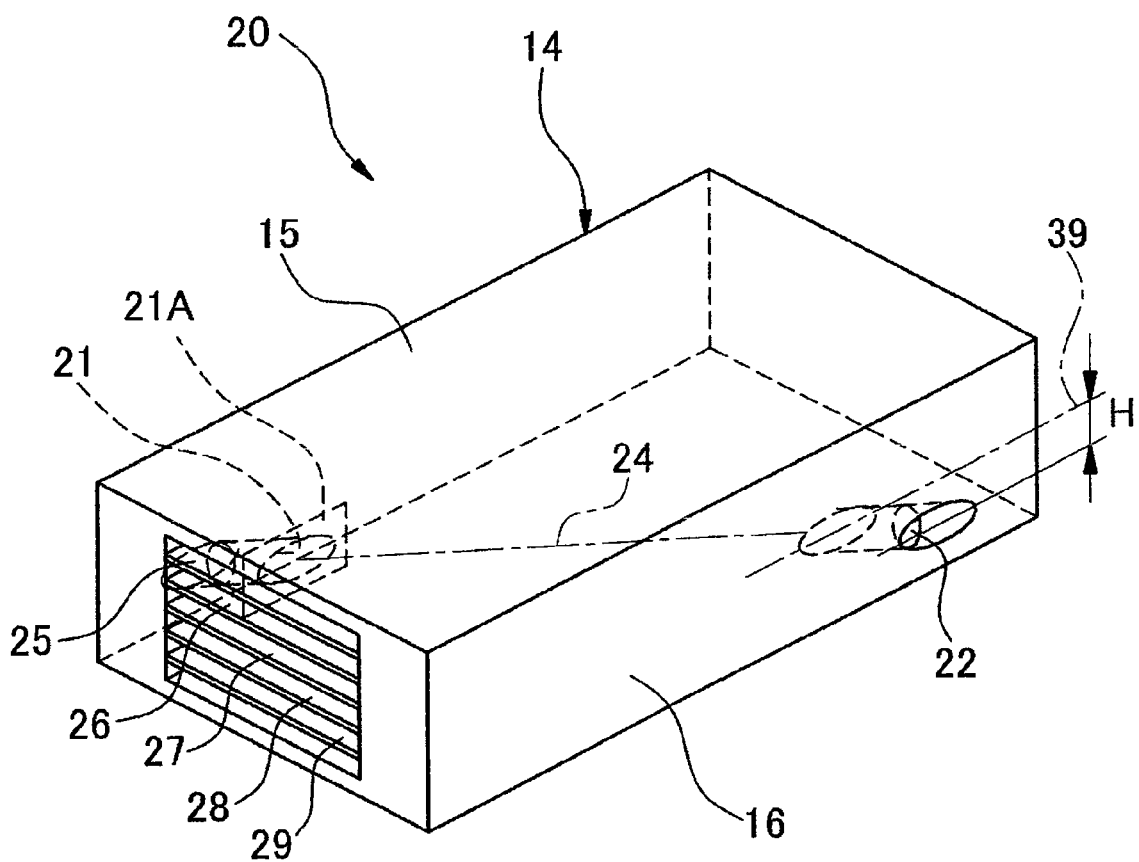
FIG. 2 is a perspective view showing an ultrasonic measuring portion of the ultrasonic flow rate measuring device according to the first embodiment of the present invention.
Figure 3:
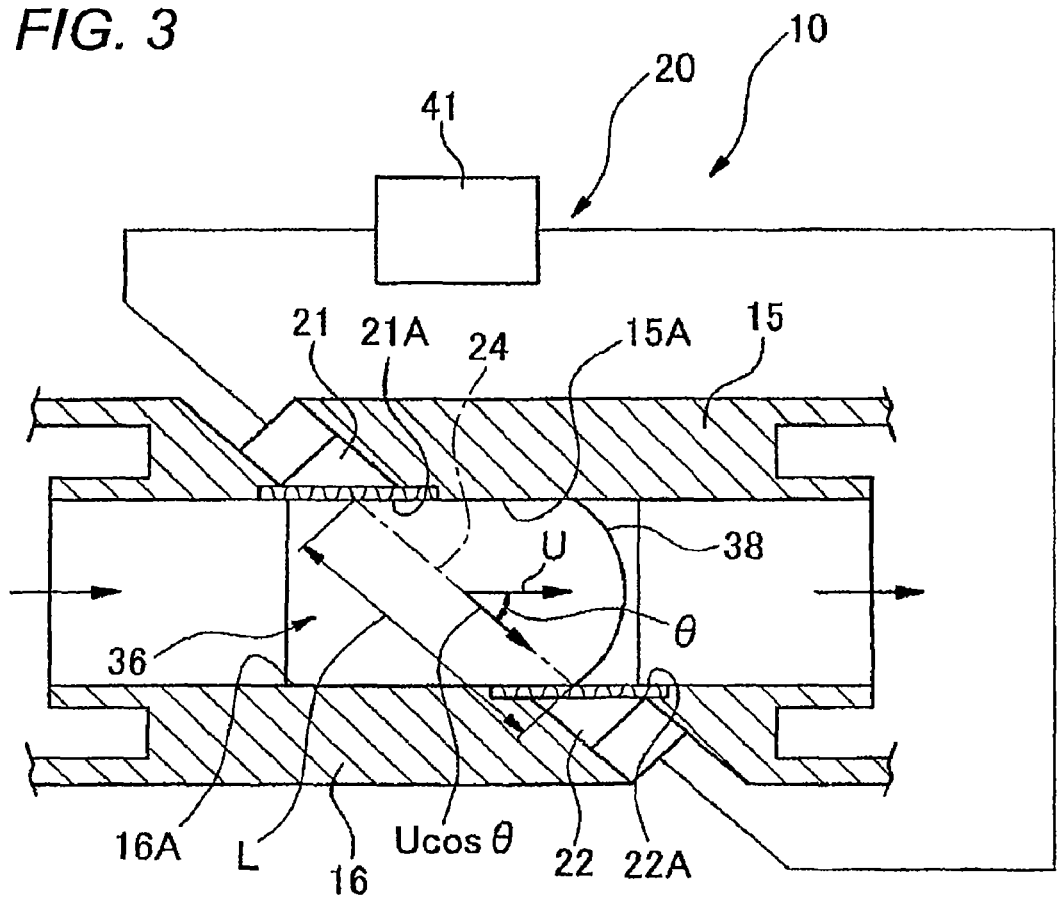
FIG. 3 is a sectional view taken along an A-A line in FIG. 1.

As shown in FIG. 1 to FIG. 3, an ultrasonic flow rate measuring device 10 according to the first embodiment of the present invention includes a fluid channel 11, an ultrasonic measuring portion 20, and first to fifth partitioning plates 25 to 29. The fluid channel 11 is formed into a generally U-shape with left and right vertical channel 12, 13 and a horizontal channel (the measurement passage) 14. In the ultrasonic measuring portion 20, a first ultrasonic transmitter-receiver (a ultrasonic transmitter) 21 and a second ultrasonic transmitter-receiver (a ultrasonic receiver) 22 are provided respectively to left and right side walls (a pair of opposing inner surfaces) 15, 16 of the measurement passage 14. The first to fifth partitioning plates 25 to 29 are present in the measurement passage 14 such that when viewed from the side, these partitioning plates are arranged substantially in parallel with an ultrasonic wave propagation path 24 which connects the first ultrasonic transmitter-receiver 21 and the second ultrasonic transmitter-receiver 22.

The ultrasonic wave propagation path 24 runs across the flow at an angle. In this case, such an arrangement is called the Z-path or the Z method which contemplates that the first and second ultrasonic transmitter-receivers 21, 22 are arranged to face each other across the flow at an angle. In the present embodiment, an explanation will be made based on this Z path arrangement.

The fluid channel 11 has an isolation valve 31 in the left vertical channel 12. The first to fifth partitioning plates 25 to 29 are provided at regular intervals in the measurement passage 14 from an upper wall portion 17 to a lower wall portion 18.

As shown in FIG. 2, the measurement passage 14 is rectangular in cross section, which is delineated by the left and right side walls 15, 16 and the upper and lower wall portions 17, 18. Also, with the first to fifth partitioning plates 25 to 29 are provided at regular intervals in the measurement passage 14, first to sixth flat passages 32 to 37 are laminated/formed as a plurality of flat passages in the measurement passage 14, as shown in FIG. 4.

The first to sixth flat passages 32 to 37 are each formed to have a cross section which is substantially rectangular.

In the fluid channel 11, as shown in FIG. 1, when the isolation valve 31 is moved from the closed position indicated by an uneven broken line to the open position indicated by a solid line, a fluid (for example, a gas) 38 flows from the left vertical channel 12 to the right vertical channel 13 through the measurement passage 14, as indicated with the arrows.

Figure 4:
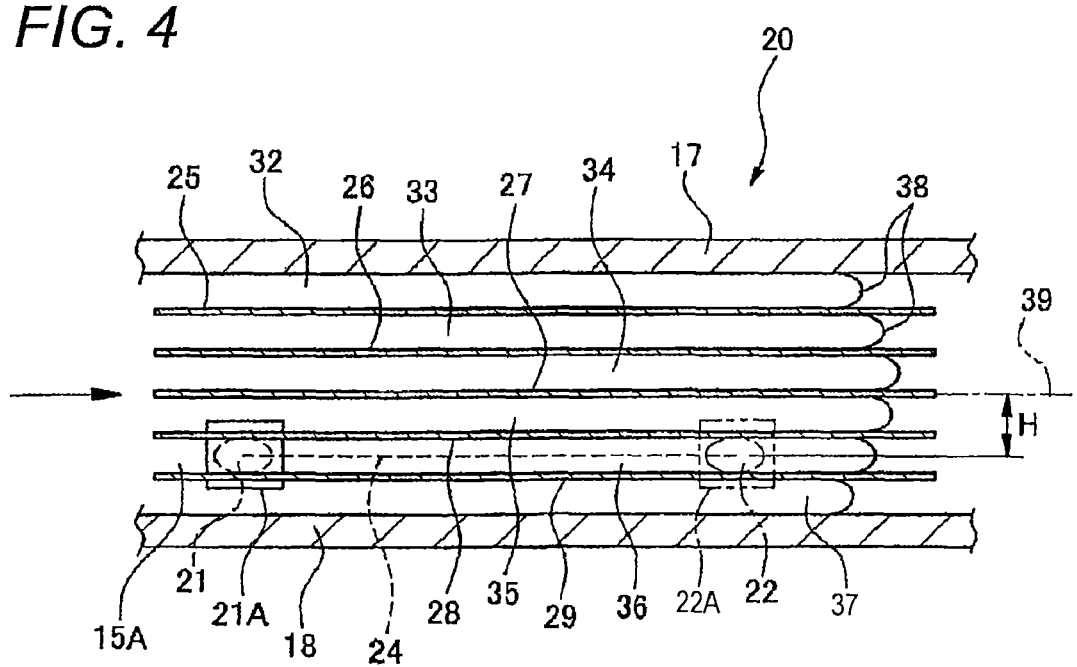
FIG. 4 is an enlarged view showing the ultrasonic measuring portion according to the first embodiment.

At this time, as shown in FIG. 4, among those flowing through the first to sixth flat passages 32 to 37, one of the fluid flows 38 which flow through the third and fourth flat passages 34 to 35 located adjacent to the fluid passage center (center) 39 of the measurement passage 14 has the maximum flow rate.

Also, it is highly possible that, among those flowing through the first to sixth flat passages 32 to 37, one of the fluid flows 38 in the first and sixth flat passages 32, 37 located by the upper and lower wall portions 17, 18 of the measurement passage 14 has the minimum flow rate.

Also, it is highly possible that, among those flowing through the first to sixth flat passages 32 to 37, the fluid flows 38 in the second and fifth flat passages 33, 36 have flow rates substantially equal to the average flow rate.

In the ultrasonic measuring portion 20, the first ultrasonic transmitter-receiver 21 and the second ultrasonic transmitter-receiver 22 are arranged such that the ultrasonic wave propagation path connecting the first ultrasonic transmitter-receiver 21 and the second ultrasonic transmitter-receiver 22 is offset downward from the center 39 along the lamination direction of the first to sixth flat passages (i.e., in the vertical direction) by a height (distance) H. A calculating portion 41 is connected to the first ultrasonic transmitter-receiver 21 and the second ultrasonic transmitter-receiver 22.

The ultrasonic wave propagation path connecting the first ultrasonic transmitter-receiver 21 and the second ultrasonic transmitter-receiver 22 which is offset from the center 39 by the height H is located as shown in FIG. 4, such that the first ultrasonic transmitter-receiver 21 and the second ultrasonic transmitter-receiver 22 face each other in the fifth flat passage 36.

Since the first ultrasonic transmitter-receiver 21 and the second ultrasonic transmitter-receiver 22 face each other in the fifth flat passage 36, the ultrasonic measuring portion 20 can measure the flow rate of the fluid flow flowing in the fifth flat passage 36 which is considered substantially equal to the average flow rate.

The first ultrasonic transmitter-receiver 21 is positioned in the left side wall 15 at a portion 15A upstream of the second ultrasonic transmitter-receiver 22 and faces the fifth flat passage 36 via an ultrasonic transmitting material 21A (see FIG. 3).

The second ultrasonic transmitter-receiver 22 is positioned in the right side wall 16 at a portion 16A downstream of the first ultrasonic transmitter-receiver 21 and faces the fifth passage 36 via an ultrasonic transmitting material 22A (see FIG. 3).

Specifically, as shown in FIG. 3, the ultrasonic wave propagation path 24 between the first ultrasonic transmitter-receiver 21 and the second ultrasonic transmitter-receiver 22 is in the Z-path in which the ultrasonic wave propagation path 24 runs obliquely at an angle $\theta$ with respect to the flow direction (the direction indicated with the arrow) of the fifth flat passage 36, when viewed from the top.

Also, the propagation distance of the ultrasonic wave propagation path 24 between the first ultrasonic transmitter-receiver 21 and the second ultrasonic transmitter-receiver 22 is set to L.

Using the values of the sound velocity C, the propagation distance L, the angle $\theta$ of the ultrasonic wave propagation path, a first ultrasonic wave propagation time T1 required of the ultrasonic wave to travel from the first ultrasonic transmitter-receiver 21 to the second ultrasonic transmitter-receiver 22, and a second ultrasonic wave propagation time T2 required of the ultrasonic wave to travel from the second ultrasonic transmitter-receiver 22 to the first ultrasonic transmitter-receiver 21, the calculating portion 41 calculates a flow rate U of the fluid from Eq. (1) to Eq. (3).

$$T1 = L/(C + U \cos \theta) \qquad (1)$$

$$T2 = L/(C - U \cos \theta) \qquad (2)$$

$$U = L/2 \cos \theta ((1/T1) - (1/T2)) \qquad (3)$$

Next, an operation of the ultrasonic flow rate measuring device 10 according to the first embodiment will be explained with reference to FIG. 1, FIG. 3, and FIG. 4 hereunder.

Fluid (gas) is caused to flow into the left vertical channel 12 by opening the isolation valve 31 of the fluid channel 11 shown in FIG. 1. The fluid that flows into the left vertical channel 12 flows in turn into the measurement passage 14. The fluid that flows into the measurement passage 14 flows in turn into the first to sixth flat passages 32 to 37 as shown in FIG. 4.

As shown in FIG. 4, there is a high possibility that, among those flowing through the first to sixth flat passages 32 to 37, the fluid flows 38 flowing in the second and fifth flat passages 33, 36 have flow rates substantially equal to the average flow rate.

The ultrasonic wave is emitted toward the second ultrasonic transmitter-receiver 22 from the first ultrasonic transmitter-receiver 21 shown in FIG. 4. The ultrasonic wave propagates from the first ultrasonic transmitter-receiver 21 to the second ultrasonic transmitter-receiver 22 through the fluid flowing in the fifth flat passage 36. The first ultrasonic wave propagation time T1 taken by the ultrasonic wave to propagate from the first ultrasonic transmitter-receiver 21 to the second ultrasonic transmitter-receiver 22 is calculated by the calculating portion 41.

Similarly, the ultrasonic wave is emitted toward the first ultrasonic transmitter-receiver 21 from the second ultrasonic transmitter-receiver 22. The ultrasonic wave propagates from the second ultrasonic transmitter-receiver 22 to the first ultrasonic transmitter-receiver 21 through the fluid flowing in the fifth flat passage 36. The second ultrasonic wave propagation time T2 taken by the ultrasonic wave to propagate from the second ultrasonic transmitter-receiver 22 to the first ultrasonic transmitter-receiver 21 is calculated by the calculating portion 41.

The flow rate U of the gas is calculated based on the first and second ultrasonic wave propagation times T1, T2.

Here, it is highly possible that the fluid flow 38 flowing in the fifth flat passage 36 among those flowing in the first to sixth flat passages 32 to 37 has a flow rate substantially equal to the average flow rate.

Therefore, when the flow rate of the fluid flow 38 flowing through the fifth flat passage 36 is measured, the average flow rate of the fluid flowing through the measurement passage 14 can be measured. As a result, the flow rate of the fluid can be measured with a high accuracy.

In the present embodiment, the fluid channel 11 is formed into a generally U-shape with the left and right vertical channels 12, 13 and the horizontal channels (the measurement passage) 14. But any fluid channels may be employed as long as those fluid channels form a generally U-shaped channel, and the fluid pass is not restricted to this embodiment. For example, a configuration obtained by turning the present embodiment by 90 degree may be employed, i.e., a fluid channel may be constructed by upper and lower horizontal channels and a vertical channel (the measurement passage).

Next, ultrasonic flow rate measuring devices according to second to fourth embodiments will be explained with reference to FIG. 5 to FIG. 7 hereunder. In order to facilitate the understanding of the ultrasonic flow rate measuring device, the ultrasonic transmitting materials 21A, 22A are omitted from FIG. 5 to FIG. 7.

Second Embodiment

Figure 5:
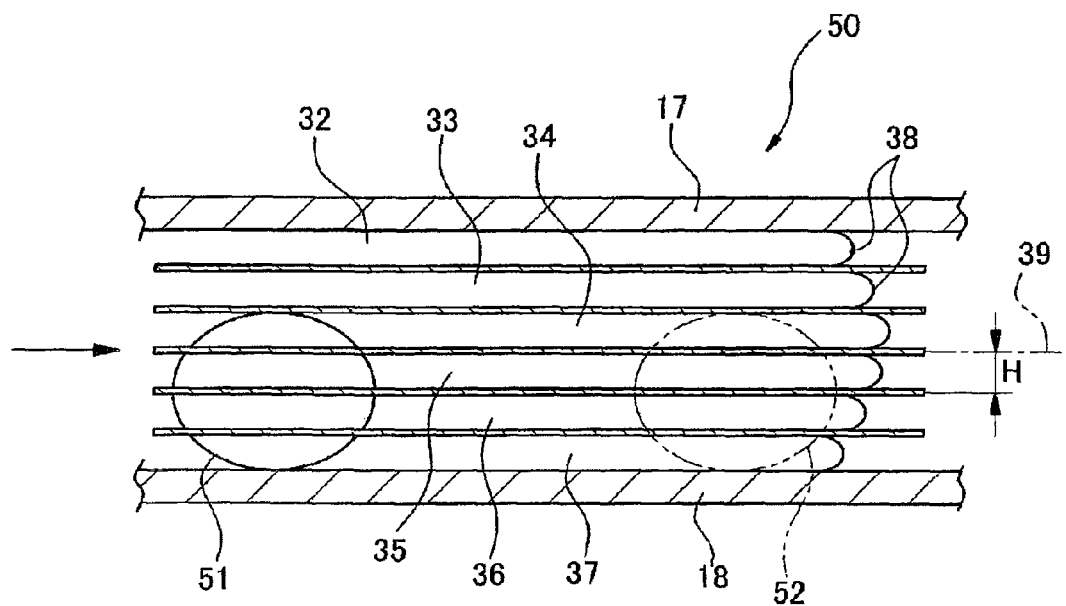
FIG. 5 is an enlarged view showing an ultrasonic measuring portion of an ultrasonic flow rate measuring device according to a second embodiment.

In an ultrasonic flow rate measuring device 50 shown in FIG. 5 according to the second embodiment, a first ultrasonic transmitter-receiver 51 and a second ultrasonic transmitter-receiver 52 are arranged such that an ultrasonic wave propagation path connecting the first ultrasonic transmitter-receiver 51 and the second ultrasonic transmitter-receiver 52 is offset downward from the center 39 along the lamination direction of the first to sixth flat passages 32 to 37 (i.e., in the vertical direction) by a height (distance) H. The first ultrasonic transmitter-receiver 51 and the second ultrasonic transmitter-receiver 52 are both made extensive to cover the third to sixth flat passages 34 to 37, for example. The remaining configurations are similar to those of the first embodiment.

The first ultrasonic transmitter-receiver 51 has the same functions as the first ultrasonic transmitter-receiver 21, except that it is made larger in size than the first ultrasonic transmitter-receiver 21 of the first embodiment.

The second ultrasonic transmitter-receiver 52 has the same functions as the second ultrasonic transmitter-receiver 22, except that it is made larger in size than the second ultrasonic transmitter-receiver 22 of the first embodiment.

According to the ultrasonic flow rate measuring device 50 of the second embodiment, the first ultrasonic transmitter-receiver 51 and the second ultrasonic transmitter-receiver 52 are extensive over the third to sixth flat passages 34 to 37, and therefore a flow rate of the fluid flows 38 passing through the third to sixth flat passages 34 to 37 can be measured. As a result, a flow rate close to the average flow rate can be measured.

Third Embodiment

Figure 6:
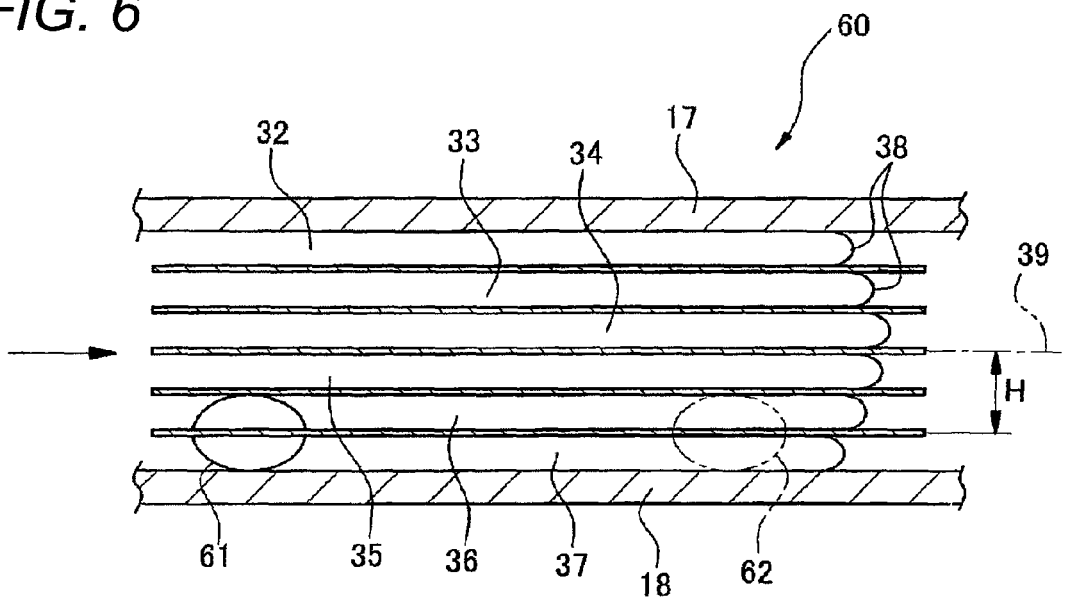
FIG. 6 is an enlarged view showing an ultrasonic measuring portion of an ultrasonic flow rate measuring device according to a third embodiment.

In an ultrasonic flow rate measuring device 60 shown in FIG. 6 according to a third embodiment, a first ultrasonic transmitter-receiver 61 and a second ultrasonic transmitter-receiver 62 are arranged such that an ultrasonic wave propagation path connecting the first ultrasonic transmitter-receiver 61 and the second ultrasonic transmitter-receiver 62 is offset downward from the center 39 along the lamination direction of the first to sixth flat passes 32-37 (i.e., in the vertical direction) by a height (distance) H. The first ultrasonic transmitter-receiver 61 and the second ultrasonic transmitter-receiver 62 are both extensive to cover those of the first to sixth flat passages 32 to 37 which are exclusive of the third and fourth flat passages 34, 35, through which the fluid flows 38 pass at the highest flow rate, and exclusive of one of the first and sixth flat passages 32, 37, through which the fluid flows 38 pass at the lowest flow rate, e.g., the fifth and sixth flat passages 36, 37. The remaining configurations are similar to those of the first embodiment.

The first ultrasonic transmitter-receiver 61 has the same functions as the first ultrasonic transmitter-receiver 21, except that it is made larger in size than the first ultrasonic transmitter-receiver 21 of the first embodiment.

The second ultrasonic transmitter-receiver 62 has the same functions as the second ultrasonic transmitter-receiver 22, except that it is made larger in size than the second ultrasonic transmitter-receiver 22 of the first embodiment.

According to the ultrasonic flow rate measuring device 60 of the third embodiment, the first ultrasonic transmitter-receiver 61 and the second ultrasonic transmitter-receiver 62 are arranged to cover those of the first to sixth flat passages 32-37 which are exclusive of the third and fourth flat passages 34, 35, in which the fluid flows 38 passage at the highest flow rate, and exclusive of one of the first and sixth flat passages 32, 37, in which the fluid flows 38 passage at the lowest flow rate, e.g., the fifth and sixth flat passages 36, 37. As a result, a flow rate close to the average flow rate can be measured by the first ultrasonic transmitter-receiver 61 and the second ultrasonic transmitter-receiver 62.

Fourth Embodiment

In an ultrasonic flow rate measuring device 70 shown in FIG. 7 according to a fourth embodiment, a first ultrasonic transmitter-receiver 71 and a second ultrasonic transmitter-receiver 72 are arranged to cover those of the first to sixth flat passages 32 to 37 which are inclusive of the third and fourth flat passages 34, 35, through which the fluid flows 38 pass at the highest flow rate, but are exclusive of one of the first and sixth flat passages 32, 37, through which the fluid flows 38 pass at the lowest flow rate, e.g., the third to fifth flat passages 34 to 36. The remaining configurations are similar to those of the first embodiment.

The first ultrasonic transmitter-receiver 71 has the same functions as the first ultrasonic transmitter-receiver 21, except that it is made larger in size than the first ultrasonic transmitter-receiver 21 of the first embodiment.

The second ultrasonic transmitter-receiver 72 has the same functions as the second ultrasonic transmitter-receiver 22, except that it is made larger in size than the second ultrasonic transmitter-receiver 22 of the first embodiment.

According to the ultrasonic flow rate measuring device 70 of the fourth embodiment, the first ultrasonic transmitter-receiver 71 and the second ultrasonic transmitter-receiver 72 are arranged to cover those of the first to sixth flat passages 32-37 which are inclusive of the third and fourth flat passages 34, 35, through which the fluid flows 38 passage at the highest flow rate but are exclusive of one of the first and sixth flat passages 32, 37, through which the fluid flows 38 passage at the lowest flow rate, e.g., the third to fifth passages 34 to 36. As a result, a flow rate close to the average flow rate can be measured by the first ultrasonic transmitter-receiver 71 and the second ultrasonic transmitter-receiver 72.

In the above embodiments, the ultrasonic wave propagation path 24 between the first ultrasonic transmitter-receiver 21 and the second ultrasonic transmitter-receiver 22 is set according to the Z-path. The present invention is not restricted to those embodiments. The ultrasonic wave propagation path 24 may be configured such that a pair of ultrasonic transmitter-receivers 21, 22 are both provided on one of the side walls of the measurement passage 14 e.g., on either the side wall 15 or the side wall 16, and then a propagation time of the ultrasonic wave may be measured by causing the ultrasonic wave to reflect on the other side wall surface of the measurement passage 14 once (the V-path or the V method) or twice (the W-path or the W method). Also, a pair of ultrasonic transmitter-receivers 21, 22 may be arranged in such a pattern that creates no angle with respect to the flow, i.e., the ultrasonic wave is transmitted/received in parallel with the flow (the I-path or the I-method).

Also, the shapes and the configurations of the fluid channel 11, the measurement passage 14, and the like illustrated in the above embodiments are not restricted to them, and may be changed appropriately.

Figure 8A:
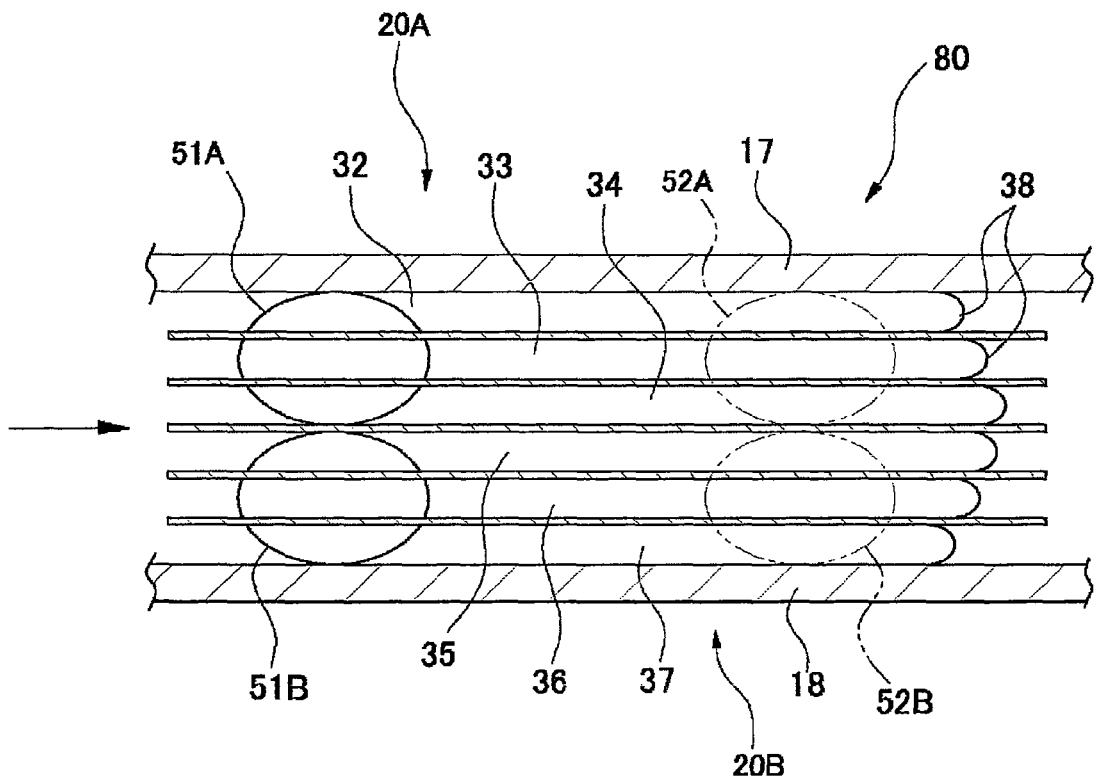
FIGS. 8A and 8B are an enlarged view and a major schematic perspective view showing an ultrasonic measuring portion of an ultrasonic flow rate measuring device according to a fifth embodiment.
Figure 8B:
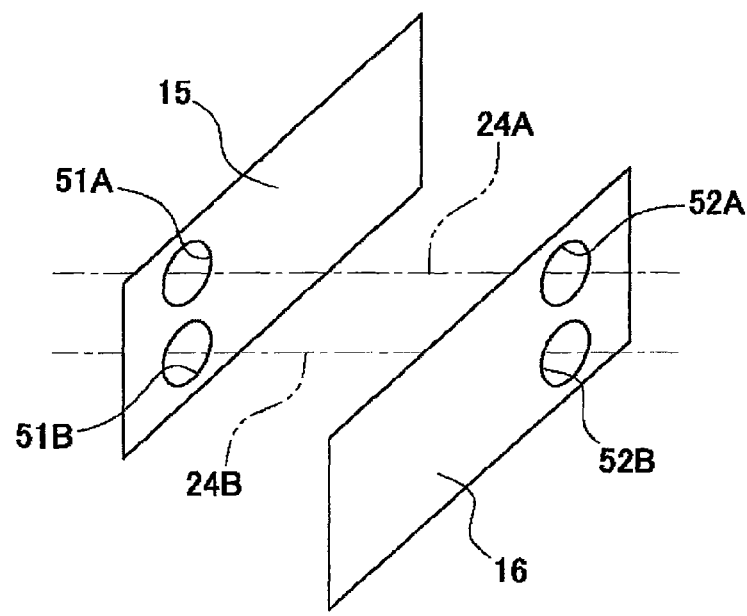
Figure 9A:
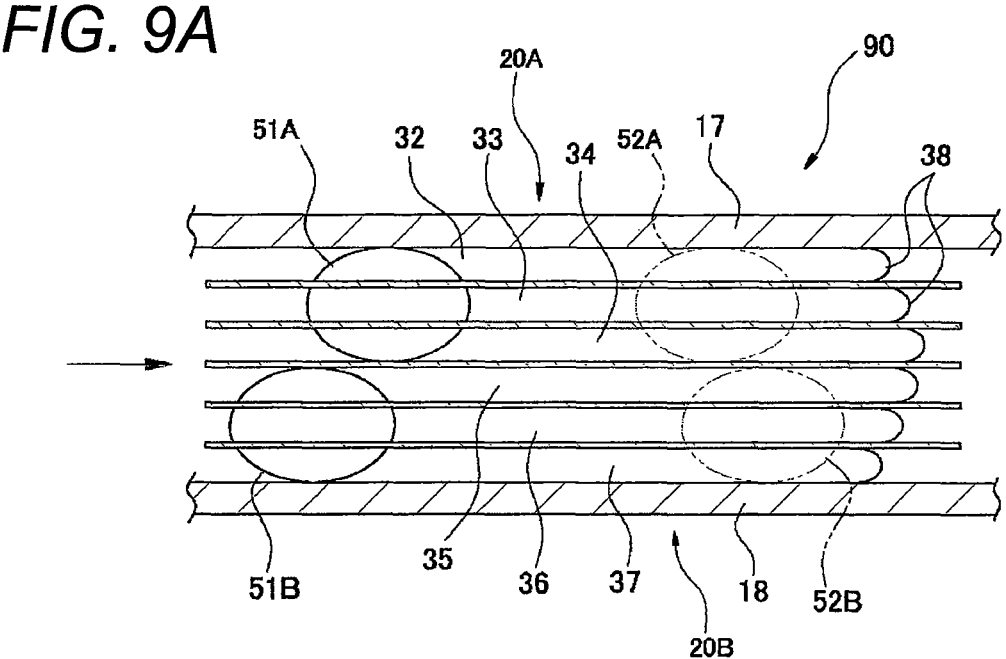
FIGS. 9A to 9C are an enlarged view, a major schematic perspective view, and a major schematic plan view showing an ultrasonic measuring portion of an ultrasonic flow rate measuring device according to a sixth embodiment.
Figure 9B:
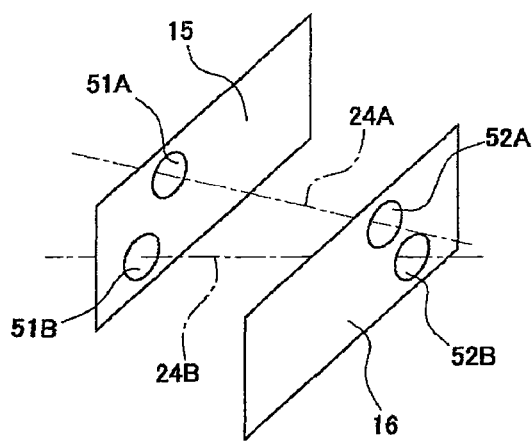
Figure 9C:
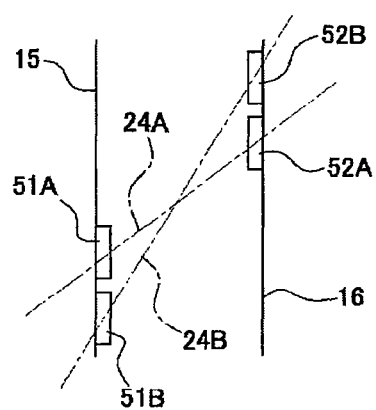

For example, a fifth embodiment shown in FIGS. 8A and 8B and a sixth embodiment shown in FIGS. 9A to 9C also fall within the scope of the present invention.

An ultrasonic flow rate measuring device 80 shown in FIGS. 8A and 8B according to a fifth embodiment is equipped with a first ultrasonic measuring portion 20A and a second ultrasonic measuring portion 20B. The first ultrasonic measuring portion 20A and the second ultrasonic measuring portion 20B are arranged in positions that are offset upward and downward from the center 39 along the lamination direction of the first to sixth flat passages 32 to 37 (i.e., in the vertical direction).

Specifically, the first ultrasonic measuring portion 20A comprises a first ultrasonic transmitter-receiver 51A and a second ultrasonic transmitter-receiver 52A which are arranged to cover the first to third flat passages 32 to 34.

In contrast, the second ultrasonic measuring portion 20B comprises a first ultrasonic transmitter-receiver 51B and a second ultrasonic transmitter-receiver 52B which are arranged to cover the fourth to sixth flat passages 35 to 37.

Therefore, as shown in FIG. 8B, in the ultrasonic flow rate measuring device 80, an ultrasonic wave propagation path 24A between the first ultrasonic transmitter-receiver 51A and the second ultrasonic transmitter-receiver 52A and an ultrasonic wave propagation path 24B between the first ultrasonic transmitter-receiver 51B and the second ultrasonic transmitter-receiver 52B are set in parallel with each other when views along the lamination direction of the first to sixth flat passages 32 to 37.

According to the ultrasonic flow rate measuring device 80, since the fluid flows in the first to sixth flat passages 32 to 37 are all measured by the first ultrasonic measuring portion 20A and the second ultrasonic measuring portion 20B, the flow rate of the fluid flows 38 can be measured with a better accuracy.

Also, such an operation is possible in which the flow rate of the fluid flows 38 is normally measured by using only one of the first ultrasonic measuring portion 20A and the second ultrasonic measuring portion 20B and when a higher measurement accuracy is needed, the flow rate of the fluid flows 38 is measured with a better accuracy, using both the first ultrasonic measuring portion 20A and the second ultrasonic measuring portion 20B.

An ultrasonic flow rate measuring device 90 shown in FIGS. 9A to 9C according to a sixth embodiment is a variation of the above fifth embodiment. The first ultrasonic transmitter-receiver 51A, the second ultrasonic transmitter-receiver 52A, the first ultrasonic transmitter-receiver 51B, and the second ultrasonic transmitter-receiver 52B are arranged such that the ultrasonic wave propagation path 24A and the ultrasonic wave propagation path 24B intersect with each other when viewed along the lamination direction of the first to sixth flat passages 32 to 37 (see FIGS. 9B,9C).

According to the ultrasonic flow rate measuring device 90, like the fifth embodiment, since the fluid flows in the first to sixth flat passages 32 to 37 are all measured by the first ultrasonic measuring portion 20A and the second ultrasonic measuring portion 20B, the flow rate of the fluid flows 38 can be measured with a better accuracy.

Also, such an operation is possible in which the flow rate of the fluid 38 is normally measured, using only one of the first ultrasonic measuring portion 20A and the second ultrasonic measuring portion 20B and when a higher measurement accuracy is needed, the flow rate of the fluid 38 is measured with a better accuracy, using both the first ultrasonic measuring portion 20A and the second ultrasonic measuring portion 20B.

Also, the first ultrasonic measuring portion 20A and the second ultrasonic measuring portion 20B may be selectively used according to the flow rate of the fluid in order to achieve the optimum measurement. Thus, a measuring accuracy can be improved.

This application is based upon Japanese Patent Application (Patent Application No. 2006-254432) filed on Sep. 20, 2006; the contents of which are incorporated herein by reference.

The present invention is suitable for the application to the ultrasonic flow rate measuring device that measures an average flow rate of the fluid flowing through the measurement passage.

The invention claimed is:

1. An ultrasonic flow rate measuring device, comprising:
a measurement passage through which a fluid flows;
an ultrasonic measuring portion comprising a first ultrasonic transmitter-receiver and a second ultrasonic transmitter-receiver provided to the measurement passage; and
a plurality of partitioning plates arranged in the measurement passage such that the partition plates are set substantially in parallel with an ultrasonic wave propagation path that connects the first ultrasonic transmitter-receiver and the second ultrasonic transmitter-receiver and form a plurality of flat passages laminated in the measurement passage,
wherein the first ultrasonic transmitter-receiver and the second ultrasonic transmitter-receiver are arranged such that the ultrasonic wave propagation path is offset from a center of the measurement passage along a direction in which the flat passages laminate.

2. An ultrasonic flow rate measuring device according to claim 1, wherein the first ultrasonic transmitter-receiver and the second ultrasonic transmitter-receiver are arranged to face a flat passage through which the fluid flows at a flow rate substantially equal to an average flow rate of fluid flows flowing the flat passages.

3. An ultrasonic flow rate measuring device according to claim 1, wherein the first ultrasonic transmitter-receiver and the second ultrasonic transmitter-receiver are arranged to face a plurality of flat passages that are continuously laminated.

4. An ultrasonic flow rate measuring device according to claim 1, wherein the first ultrasonic transmitter-receiver and the second ultrasonic transmitter-receiver are arranged to face at least one of the flat passages which is exclusive of flat passages through which the fluid passes at a highest flow rate and exclusive of one of flat passages through which the fluid passes at a lowest flow rate.

5. An ultrasonic flow rate measuring device according to claim 1, wherein the ultrasonic wave propagation has an angle with respect to a fluid flow flowing through the measurement passage.

6. An ultrasonic flow rate measuring device according to claim 1, further comprising a second ultrasonic measuring portion comprising a first ultrasonic transmitter-receiver and a second ultrasonic transmitter-receiver, wherein the first ultrasonic transmitter-receiver and the second ultrasonic transmitter-receiver of the second ultrasonic measuring portion are arranged such that an ultrasonic wave propagation path connecting the first and second ultrasonic transmitter-receivers of the second ultrasonic measuring portion is offset from the center of the measurement passage along the lamination direction and runs through a flat passage different from a flat passage through which the ultrasonic wave propagation path of the first ultrasonic measuring portion runs.

7. An ultrasonic flow rate measuring device according to claim 6, wherein the ultrasonic wave propagation path of the first ultrasonic measuring portion and the ultrasonic wave propagation path of the second ultrasonic measuring portion are set in parallel when viewed along the lamination direction.

8. An ultrasonic flow rate measuring device according to claim 6, wherein the ultrasonic wave propagation path of the first ultrasonic measuring portion and the ultrasonic wave propagation path of the second ultrasonic measuring portion intersect with each other when viewed along the lamination direction.

9. An ultrasonic fluid measuring device, comprising:
a measurement passage through which a fluid flows;
an ultrasonic measuring portion comprising a first ultrasonic transmitter-receiver and a second ultrasonic transmitter-receiver provided to the measurement passage; and
a plurality of partitioning plates arranged in the measurement passage such that the partitioning plates are set substantially in parallel with an ultrasonic wave propagation path that connects the first ultrasonic transmitter-receiver and the second ultrasonic transmitter-receiver and form a plurality of flat passages laminated in the measurement passage;
wherein the first ultrasonic transmitter-receiver and the second ultrasonic transmitter-receiver are arranged to face at least one of the flat passages which is exclusive of flat passages through which the fluid passes at a highest flow rate and exclusive of one of flat passages through which the fluid passes at a lowest flow rate.

10. An ultrasonic flow rate measuring device according to claim 9, wherein an ultrasonic wave propagation path that connects the first ultrasonic transmitter-receiver and the second ultrasonic transmitter-receiver has an angle with respect to a fluid flow flowing through the measurement passage.

11. An ultrasonic flow rate measuring device according to claim 9, further comprising a second ultrasonic measuring portion comprising a first ultrasonic transmitter-receiver and a second ultrasonic transmitter-receiver, wherein the first ultrasonic transmitter-receiver and the second ultrasonic transmitter-receiver of the first ultrasonic measuring portion are arranged such that an ultrasonic wave propagation path connecting the first ultrasonic transmitter-receiver and the second ultrasonic transmitter-receiver of the first ultrasonic measuring portion is offset from a center of the measurement passage along a direction in which the flat passages laminate and runs through one of the flat passages, and the first ultrasonic transmitter-receiver and the second ultrasonic transmitter-receiver of the second ultrasonic measuring portion are arranged such that an ultrasonic wave propagation path connecting the first ultrasonic transmitter-receiver and the second ultrasonic transmitter-receiver of the second ultrasonic measuring portion is offset from the center of the measurement passage along the lamination direction and runs through another of the flat passages.

12. An ultrasonic flow rate measuring device according to claim 11, wherein the ultrasonic wave propagation path of the first ultrasonic measuring portion and the ultrasonic wave propagation path of the second ultrasonic measuring portion are set in parallel when viewed along the lamination direction.

13. An ultrasonic flow rate measuring device according to claim 11, wherein the ultrasonic wave propagation path of the first ultrasonic measuring portion and the ultrasonic wave propagation path of the second ultrasonic measuring portion intersect with each other when viewed along the lamination direction.

* * * * *

UNITED STATES PATENT AND TRADEMARK OFFICE
CERTIFICATE OF CORRECTION

| | | |
|---|---|---|
| PATENT NO. | : 7,913,575 B2 | Page 1 of 1 |
| APPLICATION NO. | : 12/439646 | |
| DATED | : March 29, 2011 | |
| INVENTOR(S) | : Shigeru Iwanaga et al. | |

It is certified that error appears in the above-identified patent and that said Letters Patent is hereby corrected as shown below:

In the Claims

In column 10, claim 2, line 50, before "the flat passages" insert --through--.

Signed and Sealed this
Twenty-eighth Day of June, 2011

David J. Kappos
*Director of the United States Patent and Trademark Office*